(12) United States Patent
Kaneda

(10) Patent No.: US 7,856,638 B2
(45) Date of Patent: Dec. 21, 2010

(54) ELECTRIC DEVICE HAVING A STATUS NOTIFICATION FEATURE OF NOTIFYING STATUS INFORMATION TO A REGISTERED EXTERNAL DEVICE AND CONTROL METHOD OF THE DEVICE

(75) Inventor: Takeshi Kaneda, Yokohama (JP)

(73) Assignee: Canon Kabushiki Kaisha (JP)

( * ) Notice: Subject to any disclaimer, the term of this patent is extended or adjusted under 35 U.S.C. 154(b) by 938 days.

(21) Appl. No.: 11/691,532

(22) Filed: Mar. 27, 2007

(65) Prior Publication Data
US 2007/0245355 A1    Oct. 18, 2007

(30) Foreign Application Priority Data
Mar. 31, 2006    (JP)    ............... 2006-100394

(51) Int. Cl.
G06F 13/00    (2006.01)
G06F 11/00    (2006.01)
G06F 3/12    (2006.01)

(52) U.S. Cl. .................. 719/318; 714/1; 714/25; 714/48; 358/1.15

(58) Field of Classification Search .......... 718/318; 714/1, 25, 48; 358/1.15; 719/318
See application file for complete search history.

(56) References Cited

U.S. PATENT DOCUMENTS

| 7,080,078 | B1 * | 7/2006 | Slaughter et al. ............... 1/1 |
| 7,698,276 | B2 * | 4/2010 | Seshadri et al. ............. 719/318 |
| 2003/0046395 | A1 * | 3/2003 | Fleming et al. ............. 709/226 |

FOREIGN PATENT DOCUMENTS

JP    11-203094 A    7/1999

* cited by examiner

Primary Examiner—Qing Wu
(74) Attorney, Agent, or Firm—Rossi, Kimms & McDowell LLP

(57) ABSTRACT

In correspondence with a registration request from an external device, notification setting to notify an external device of status information in an electric device is registered and a period in which the notification setting is valid is decided. In accordance with occurrence of event, the status information is notified to the external device for which the notification setting is registered. Upon expiration of the decided period, the notification setting is invalidated.

12 Claims, 19 Drawing Sheets

FIG. 8

```
<?xml version =' 1.0' ?>
<soap : Envelope
    xmlns : soap ="http://www.w3.org/2003/05/soap-envelope"
    soap : encodingStyle ='http://www.w3.org/2002/12/soap-encoding' >

<soap : Body>
<RegistEventNotificationRequest>                    ─── 801
    <ClientID>C101</ClientID>
    <RequestEventList>                              ─── 802
        <EventInfo>
            <EventType>PrEv</EventType>             ─── 803
        </EventInfo>
        <EventInfo>
            <EventType>ScEv</EventType>             ─── 804
        </EventInfo>
    </RequestEventList>
</RegistEventNotificationRequest>
</soap : Body>
</soap : Envelope>
```

FIG. 9

```
<?xml version =' 1.0' ?>
<soap : Envelope
    xmlns : soap ="http://www.w3.org/2003/05/soap-envelope"
    soap : encodingStyle ='http://www.w3.org/2002/12/soap-encoding' >

<RegistEventNotificationResponse>                           — 901
    <ClientID>C101</ClientID>
    <AcceptedEventList>
                                                            — 902
        <EventInfo>
            <RegistID>001111</RegistID>        ⎫
            <EventType>PrEv</EventType>        ⎬ — 903
            <NotifyLimit>12</NotifyLimit>      ⎭
        </EventInfo>
        <EventInfo>
            <RegistID>001112</RegistID>        ⎫
            <EventType>ScEv</EventType>        ⎬ — 904
            <NotifyLimit>7</NotifyLimit>       ⎭
        </EventInfo>
    </AcceptedEventList>
</RegistEventNotificationResponse>
</soap : Body>
</soap : Envelope>
```

FIG. 10A

```
<?xml version =' 1.0' ?>
<soap : Envelope
    xmlns : soap ="http://www.w3.org/2003/05/soap-envelope"
    soap : encodingStyle ='http://www.w3.org/2002/12/soap-encoding' >

<soap : Body>
<EventNotification>
    <To>C101</To>   ~1001
    <EventDataList>
        <EventData>
            <EventType>PrEv</EventType>   ~1002
            <Status>
                <StatusCode>0000110001</StatusCode>  ⎫
                <StatusCode>0000110002</StatusCode>  ⎬ ~1003
                <StatusCode>0000110003</StatusCode>  ⎭
            </Status>
        </EventData>
        <EventData>
            <EventType>ScEv</EventType>   ~1004
            <Status>
                <StatusCode>0000120021</StatusCode>  ⎫
                <StatusCode>0000120022</StatusCode>  ⎬ ~1005
            </Status>
        </EventData>
    <EventDataList>
</EventNotification>
<NotifyLimit>3</NotifyLimit>
</soap : Body>
</soap : Envelope>
```

FIG. 10B

```
<?xml version =' 1.0' ?>
<soap : Envelope
   xmlns : soap ="http://www.w3.org/2003/05/soap-envelope"
   soap : encodingStyle ='http://www.w3.org/2002/12/soap-encoding' >

<soap : Body>
<EventNotificationResponse>
   <Return>Success</Return>      ~1006
</EventNotificationResponse>
</soap : Body>
</soap : Envelope>
```

FIG. 12A

■ EVENT INFORMATION MANAGEMENT TABLE (SCANNER)

| EvSrc | ScSndWaitEv |
|---|---|
| ScEv2 | ScEv2Cl05 |
| | ScEv2Cl04 |
| | ScEv2Cl03 |
| | ScEv2Cl02 |
| | ScEv2Cl01 |
| ScEv1 | ScEv1Cl05 |
| | ScEv1Cl04 |
| | ScEv1Cl03 |
| | ScEv1Cl02 |
| | ScEv1Cl01 |

FIG. 12B

■ EVENT INFORMATION MANAGEMENT TABLE (PRINTER)

| EvSrc | PrSndWaiting Event |
|---|---|
| PrEv4 | PrEv4Cl03 |
| | PrEv4Cl02 |
| | PrEv4Cl01 |
| PrEv3 | PrEv3Cl03 |
| | PrEv3Cl02 |
| | PrEv3Cl01 |
| PrEv2 | PrEv2Cl03 |
| | PrEv2Cl02 |
| | PrEv2Cl01 |
| PrEv1 | PrEv1Cl03 |
| | PrEv1Cl02 |
| | PrEv1Cl01 |

FIG. 13

■ NOTIFYLIMIT MANAGEMENT TABLE

| Client ID | EvType | NoyifyLimit | RegID |
|---|---|---|---|
| Cl01 | PrEv | 4 | 1111 |
| Cl01 | ScEv | 1 | 1112 |
| Cl02 | PrEv | 7 | 1113 |
| Cl02 | ScEv | 4 | 1114 |
| Cl03 | PrEv | 9 | 1115 |
| Cl03 | ScEv | 6 | 1116 |
| Cl04 | ScEv | 7 | 1117 |
| Cl05 | ScEv | 9 | 1118 |

FIG. 14

■EVENT NOTIFICATION MANAGEMENT TABLE

| EvInfo | | CurrentStatus | | | Margine | | |
|---|---|---|---|---|---|---|---|
| Type | QueueMax | ClientNum | Processing Event | SndWaiting Event | Reserved | NewCl | SndQueue | NotifyLimit |
| ScEv | 128 | 5 | 5 | 25 | 27 | 10 | 76 | 7.6 |
| PrEv | 128 | 3 | 4 | 12 | 20 | 8 | 96 | 12 |

ELECTRIC DEVICE HAVING A STATUS NOTIFICATION FEATURE OF NOTIFYING STATUS INFORMATION TO A REGISTERED EXTERNAL DEVICE AND CONTROL METHOD OF THE DEVICE

BACKGROUND OF THE INVENTION

1. Field of the Invention

The present invention relates to an electric device which notifies an external device of status information of the electric device and a control method in the electric device.

2. Description of the Related Art

Event notification registration processing is known as processing of notifying a particular external device of occurrence of event in an electric device. Japanese Patent Application Laid-Open No. Hei 11-203094 discloses an electric device which receives an event notification registration request and registers an external device specified in the request as a notification destination, and further, upon occurrence of event in the electric device, notifies the registered external device of the occurrence of the event. Further, in this electric device, the registration of the external device is deleted from a registration table after an elapse of a predetermined time period.

In a system having such electric device and external device, the external device issues an event notification registration request to the electric device so as to obtain status information of the electric device. The electric device receives the request, and registers the external device that issued the registration request as an event notification destination. When an event occurs in the electric device, the electric device obtains registered notification destinations, and transmits event information indicating the event to all the notification destinations. In this system, in a case that the number of events which occur in the electric device is abruptly increased or in a case that the number of external devices registered as event notification destinations is abruptly increased, there is a possibility of occurrence of event notification error since notification processing cannot catch up with occurred events. This problem becomes particularly notable upon event transmission by TCP (Transmission Control Protocol) instead of UDP (User Datagram Protocol) broadcasting. Accordingly, there is a need for a system to infallibly notify external devices registered as notification destinations of event information and control event processing load before the electric device reaches a processing limit. Further, in a case that an external device which is registered as an event notification destination is a notebook PC or the like, there is a possibility that the PC is removed from the network while the registration of the PC is not released. In this case, event notification is made to the PC upon occurrence of event, and since no response is returned from the PC, a time-out will occur in the TCP transmission. These wasteful processings increases the load on the electric device. Accordingly, a system to release event notification registration in accordance with some conditions is needed.

As a system to release event notification registration, a system to automatically release event notification registration after an elapse of a predetermined time period is known. However, the predetermined time period is fixed or designated from an external device. Accordingly, there is a possibility that the external device issues a registration request regardless of situation of the electric device, to bring the electric device into heavily-loaded status and cause an event information notification error.

SUMMARY OF THE INVENTION

The present invention has an object to address the above conventional problems.

The feature of the present invention is to provide a technique of dynamically determining a period before release of status information notification to a particular external device on the side of electric device as a status information transmitting side.

According to an aspect of the present invention, there is provided an electric device for notifying an external device of status information, comprising:

a reception unit configured to receive a registration request for registration of notification setting to notify an external device of the status information in the electric device, from an external device;

a notification unit configured to notify the external device, for which the notification setting is registered in correspondence with the registration request, of the status information;

a decision unit configured to dynamically decide a period in which the notification setting is valid; and an invalidation unit configured to, upon expiration of the period decided by the decision unit, invalidate the notification setting.

Further, according to an aspect of the present invention, there is provided a control method in an electric device for notifying status information, comprising:

a reception step of receiving a registration request for registration of notification setting to notify an external device of the status information in the electric device, from an external device;

a notification step of notifying the external device, for which the notification setting is registered in correspondence with the registration request, of the status information;

a decision step of dynamically deciding a period in which the notification setting is valid; and an invalidation step of, upon expiration of the period decided in the decision step, invalidating the notification setting.

Further, the feature of the present invention is to provide a technique of dynamically determining a period of validity of status information notification to the particular external device and notifying the status information within the period.

Further features of the present invention will be apparent from the following description of exemplary embodiments with reference to the attached drawings.

BRIEF DESCRIPTION OF THE DRAWINGS

The accompanying drawings, which are incorporates in and constitutes a part of the specification, illustrate embodiments of the present invention and, together with the description, serve to explain the principle of the present invention.

FIG. 8 depicts a view illustrating an example of a SOAP (Simple Object Access Protocol) request message used by the client according to the embodiment upon event notification registration;

FIG. 9 depicts a view illustrating an example of a response message to an event notification registration request according to the embodiment;

FIG. 10A depicts a view illustrating an example of a SOAP message used by the image forming apparatus according to the embodiment upon event notification;

FIG. 10B depicts a view illustrating an example of a response message returned from the client upon event notification;

FIGS. 12A and 12B depict views illustrating event information management tables held in an event notification module according to the embodiment;

FIG. 13 depicts a view illustrating an example of a NotifyLimit management table;

FIG. 14 depicts a view illustrating an example of an event notification management table;

DESCRIPTION OF THE EMBODIMENTS

Preferred embodiments of the present invention will be described in detail with reference to the drawings. It should be noted that the embodiments do not limit the scope of the present invention, and all combinations of the characteristics described in the embodiments are not necessarily essential to implementation of the present invention.

Figure 1:
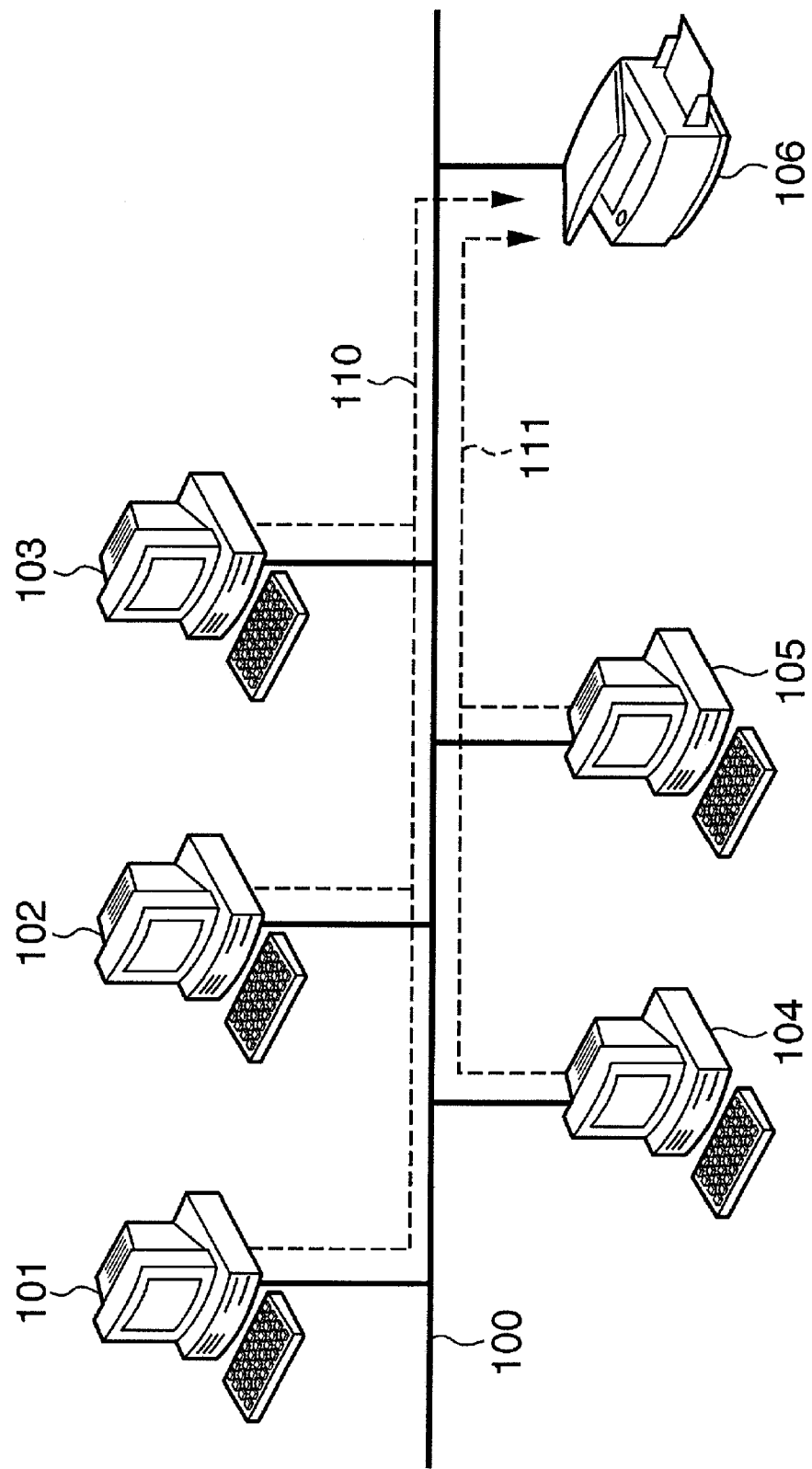
FIG. 1 depicts a system configuration according to an embodiment of the present invention.

FIG. 1 depicts a system configuration according to the embodiment of the present invention upon event notification registration processing.

Client terminals 101 to 105 as external devices (Hereinbelow, "clients"), and an image forming apparatus (copier) 106 as an electric device are connected to a LAN 100. Reference numerals 110 and 111 denote event notification registration requests from the clients to the image forming apparatus 106. The registration request 110 indicates a registration request for notifying occurrence of printer- and scanner-related events in the image forming apparatus 106 to the clients. The registration request 111 indicates a registration request for notifying occurrence of scanner-related events in the image forming apparatus 106 to the clients. Accordingly, in this figure, the clients 101 to 103 are notified of the occurrence of printer- and scanner-related events in the image forming apparatus 106, from the image forming apparatus 106. The clients 104 and 105 are notified of the occurrence of scanner-related events in the image forming apparatus 106 from the image forming apparatus 106. Hereinbelow, the notification of occurrence of event in the image forming apparatus 106 to the client(s) will be referred to as "event notification". Further, the client's registration of event notification requirement in the image forming apparatus 106 or registration of notification destination of event information indicating the occurrence of event in the image forming apparatus 106 will be referred to as "event notification registration". Further, the issuance of request for event notification registration to the image forming apparatus 106 or a request message to the image forming apparatus 106 for event notification registration will be referred to as "event notification registration request". An event occurs mainly based on the status of the image forming apparatus 106 upon e.g. occurrence of paper jam, door opening, and solution of paper jam.

Figure 2:
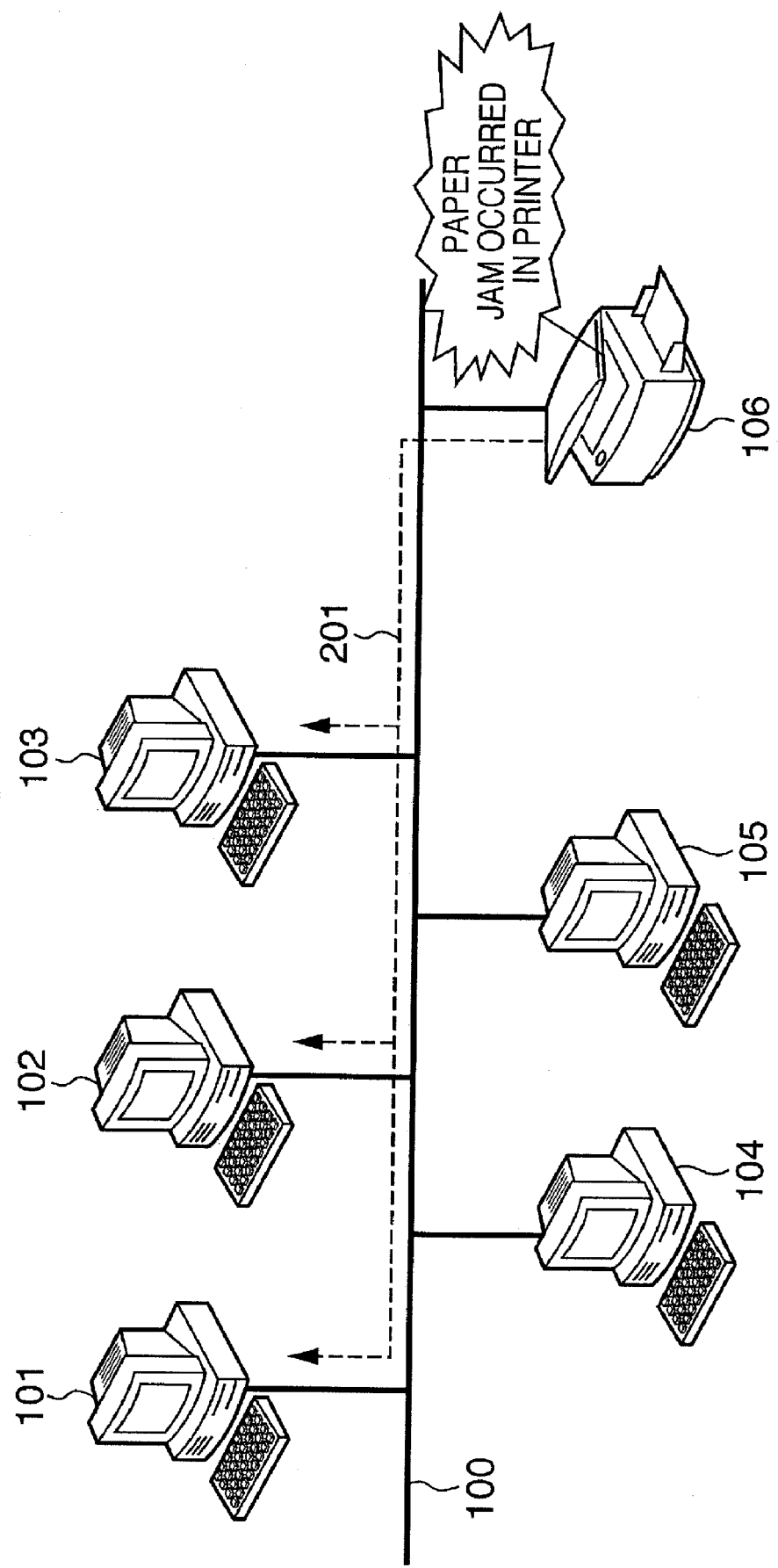
FIG. 2 depicts a system configuration upon event notification processing according to the embodiment of the present invention.

FIG. 2 depicts a system configuration upon event notification processing according to the embodiment of the present invention. In FIG. 2, elements corresponding to those in FIG. 1 have the same reference numerals.

In FIG. 2, paper jam has occurred in a printer module of the image forming apparatus 106. In this case, paper jam event information 201 is notified only to the clients 101 to 103 in correspondence with the registration request 110 in FIG. 1.

Figure 3:
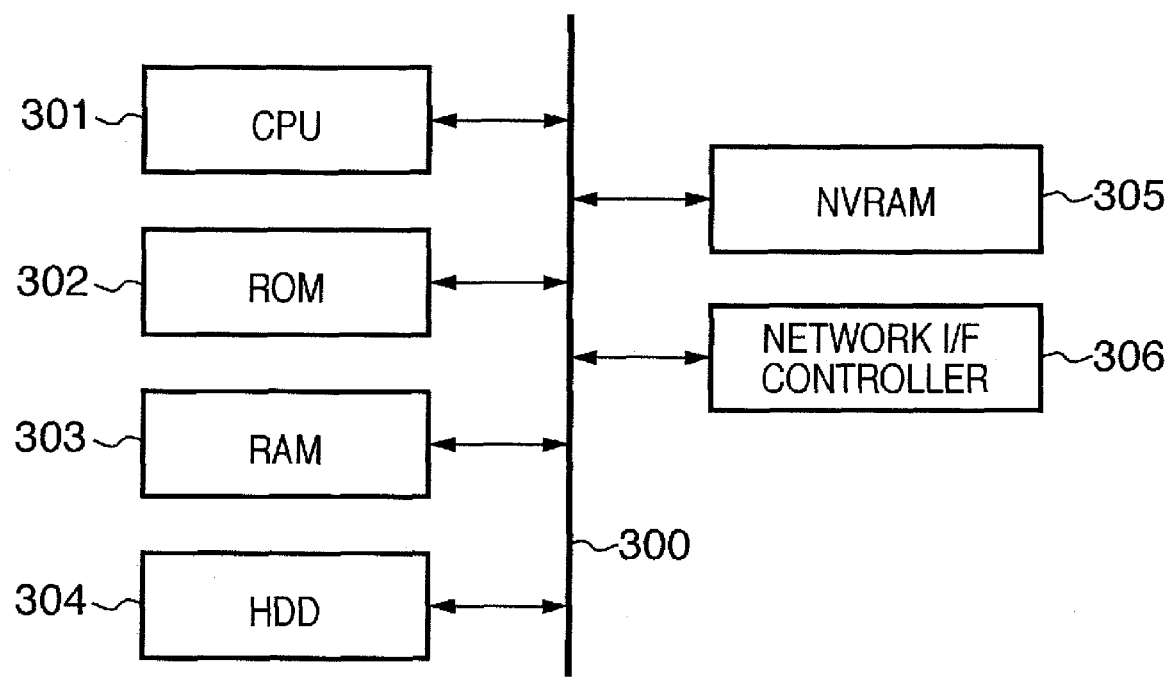
FIG. 3 is a block diagram showing the hardware configuration of a client terminal according to the embodiment.

FIG. 3 is a block diagram showing the hardware configuration of the client (101) according to the embodiment of the present invention. The client is an information processing apparatus (computer device) such as a personal computer (PC) or a work station.

A CPU 301 performs a software program of the client, and controls the entire apparatus. A ROM 302 holds a boot program of the apparatus, fixed parameters and the like. A RAM 303 is used for temporarily storing data in a case that the CPU 301 controls the apparatus. An HUD (Hard Disk Drive) 304 is used for storing various data such as software programs. An NVRAM 305 is a nonvolatile memory holding various setting values of the apparatus. A network I/F controller 306 controls data transmission/reception to/from the LAN 100. A bus 300 is a system bus with which the CPU 301, the ROM 302, the RAM 303, the HDD 304, the NVRAM 305, the network I/F controller 306 are connected, and through which control signals and data signals from the CPU 301 are transmitted/received. The various application programs, the OS and the like performed by the CPU 301 are installed on the HDD 304, and upon execution of the programs, they are loaded into the RAM 303 and performed. Note that since the other clients 102-105 have basically the same configuration as that of the client 101, the explanations of the configurations of the other clients 102-105 will be omitted.

Figure 4:
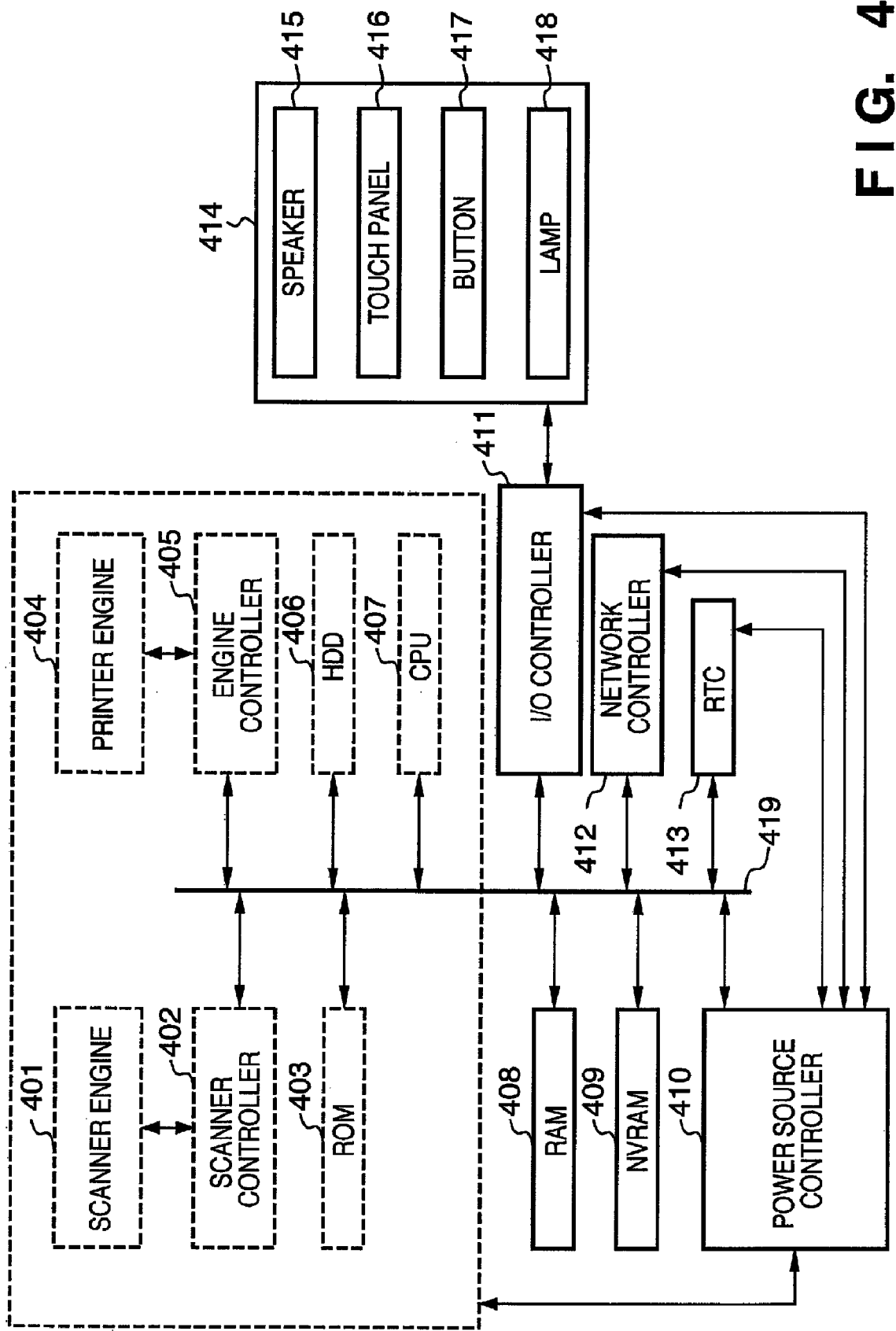
FIG. 4 is a block diagram showing the schematic configuration of an image forming apparatus according to the embodiment.

FIG. 4 is a block diagram showing the schematic hardware configuration of the image forming apparatus 106 according to the embodiment.

A scanner controller 402 controls a scanner engine 401. An engine controller 405 controls a printer engine 404. Numeral 403 denotes a ROM; numeral 406 denotes an HDD (Hard Disk Drive); and numeral 407 denotes a CPU. An NVRAM 409 which is a nonvolatile memory holds various values set by a user. An I/O controller 411 controls a console unit 414 including a speaker 415, a touch panel 416, buttons 417, a lamp 418 and the like. A network controller 412, connected with the LAN 100, controls network communication. An RTC (Real Time Clock: timer) 413, which operates even in an energy-saving mode, notifies a power source controller 410 of a resuming timing. The above elements are connected with a bus 419.

A program to control the image forming apparatus 106 is previously stored on the HDD 406. When the power is turned ON, the CPU 407 reads a boot program from the ROM 403 and implements it, and boots up the respective device control programs in accordance with the boot program. That is, the CPU 407 loads the device control programs from the HDD 406 into the RAM 408 and extracts the programs, and reads the extracted device control programs from the RAM 408, thereby performs control of the image forming apparatus 106.

Figure 5:
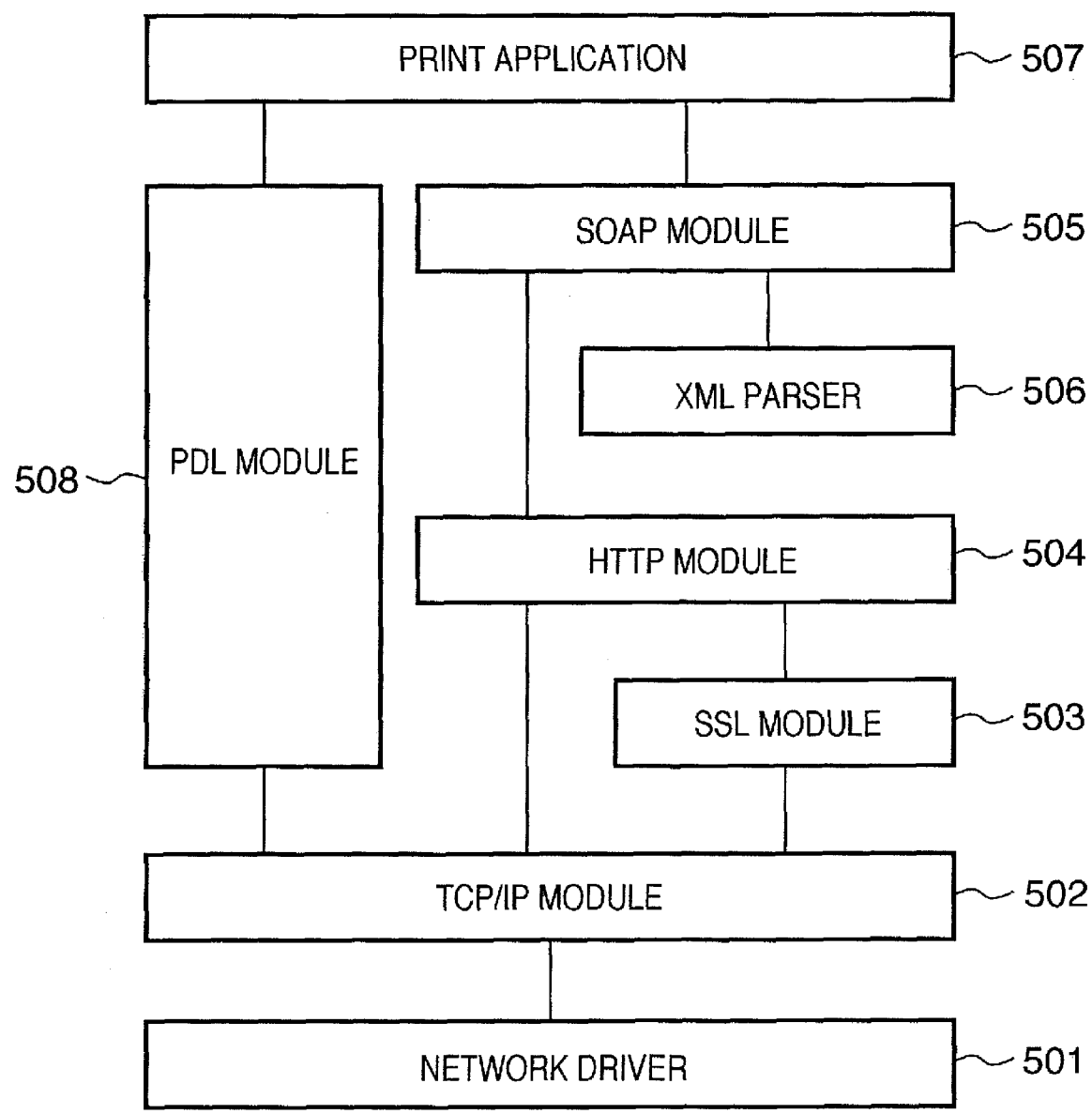
FIG. 5 is a block diagram showing the software configuration of the client terminal according to the embodiment.

FIG. 5 is a block diagram showing the software configuration of the client 101 according to the embodiment. Note that since the other clients 102-105 have the same software configuration, the explanations of the software configuration of the other clients 102-105 will be omitted.

A network driver 501 controls the network I/F controller 306 (FIG. 3), and performs data transmission/reception to/from the network 100. A TCP/IP module 502 performs communication control according to the TCP/IP protocol. An HTTP module 504, having an HTTP client function, performs communication according to the HTTP protocol with an HTTP module 604 (FIG. 6) of the image forming apparatus 106. Further, when a HTTP protocol communication by SSL connection is requested from a higher application, the HTTP module 504 realizes HTTP communication by SSL connection in cooperation with an SSL module 503. A SOAP module 505 converts data sent from a print application 507 into a SOAP request message in cooperation with an XML parser 506. The SOAP module 505 transmits the SOAP message to the image forming apparatus 106, and interprets a SOAP response message returned from the image forming apparatus 106 and forwards the result of interpretation to the print application 507. A PDL module 508 converts the print data sent from the print application 507 into PDL (Page Description Language) data supported by the image forming apparatus 106, and transfers the data as a print job.

Figure 6:
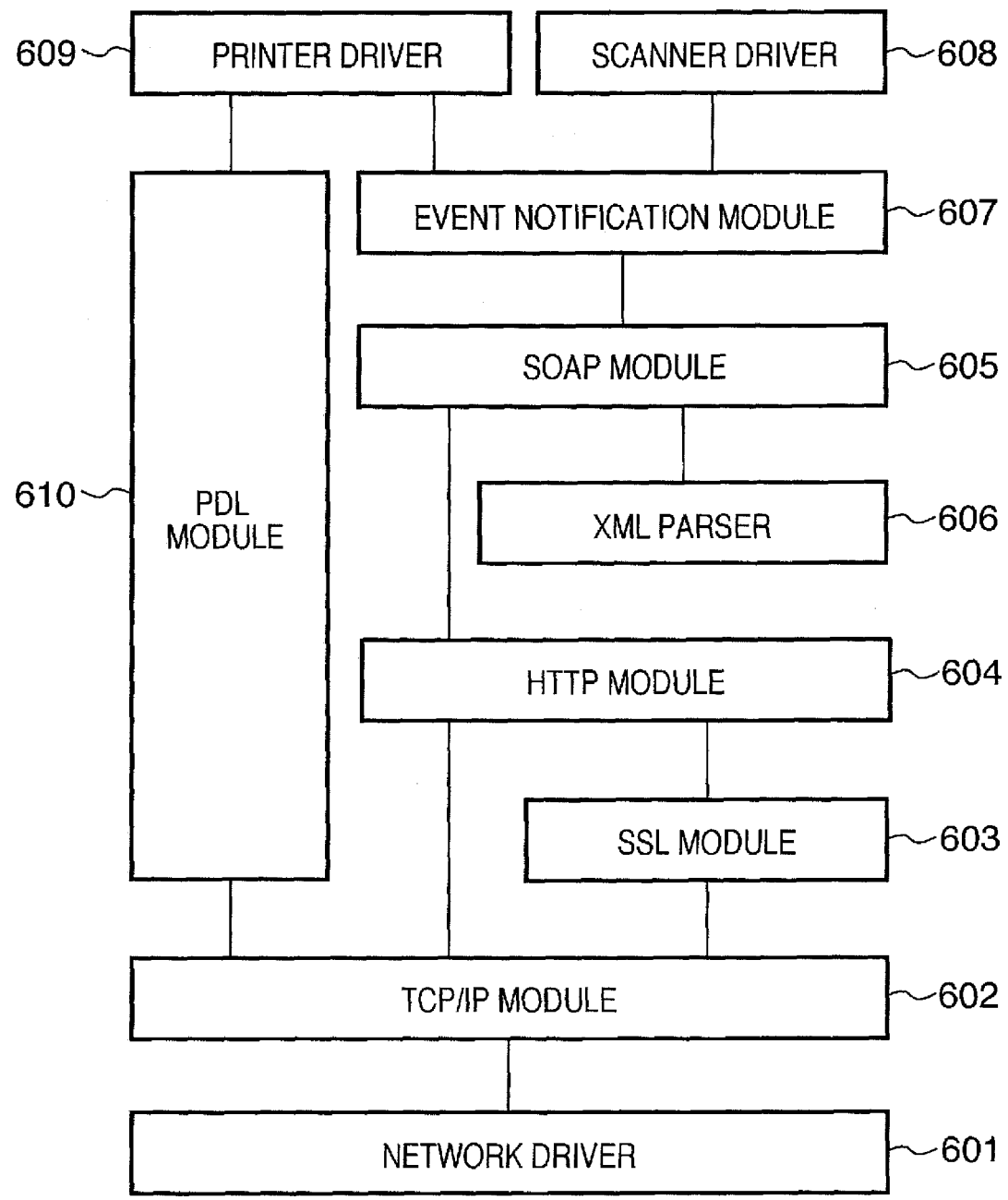
FIG. 6 is a block diagram showing the software configuration of the image forming apparatus according to the embodiment.

FIG. 6 is a block diagram showing the software configuration of the image forming apparatus 106 according to the embodiment.

A network driver 601 controls the network I/F controller 412 (FIG. 4), and performs data transmission/reception to/from the network 100. A TCP/IP module 602 controls communication in accordance with the TCP/IP protocol. The HTTP module 604, having an HTTP server function, performs communication according to the HTTP protocol with the HTTP module 504 on the client. Further, when an SSL connection request is issued from the client, the HTTP module 604 performs HTTPS communication in cooperation with an SSL module 603. In a case that the request message is an event notification registration request, the HTTP module 604, a SOAP module 605, and an event notification module 607 interpret the request, generate a response message and transmit the message. Event notification destinations are held under the control of the event notification module 607, and events to be notified are stored under the control of the event notification module 607. Accordingly, when some events occur in the printer engine 404 and the scanner engine 401 of the image forming apparatus 106, the event notification module 607 is notified of the occurrence of events via the printer driver 609 and the scanner driver 608. The event notification module 607 performs event notification and performs release processing to release event notification registration, in accordance with information of management tables held inside. A PDL module 610 receives PDL data sent from the client (101 to 105), and performs control so as to print-output (record) the PDL data through the printer driver 609 on a print medium such as a print sheet. The SOAP module 605 converts event information sent from the event notification module 607 into SOAP format data in cooperation with an XML parser 606. The SOAP module 605 transmits the event information converted to the SOAP format data to the client via the HTTP module 604.

Figure 7:
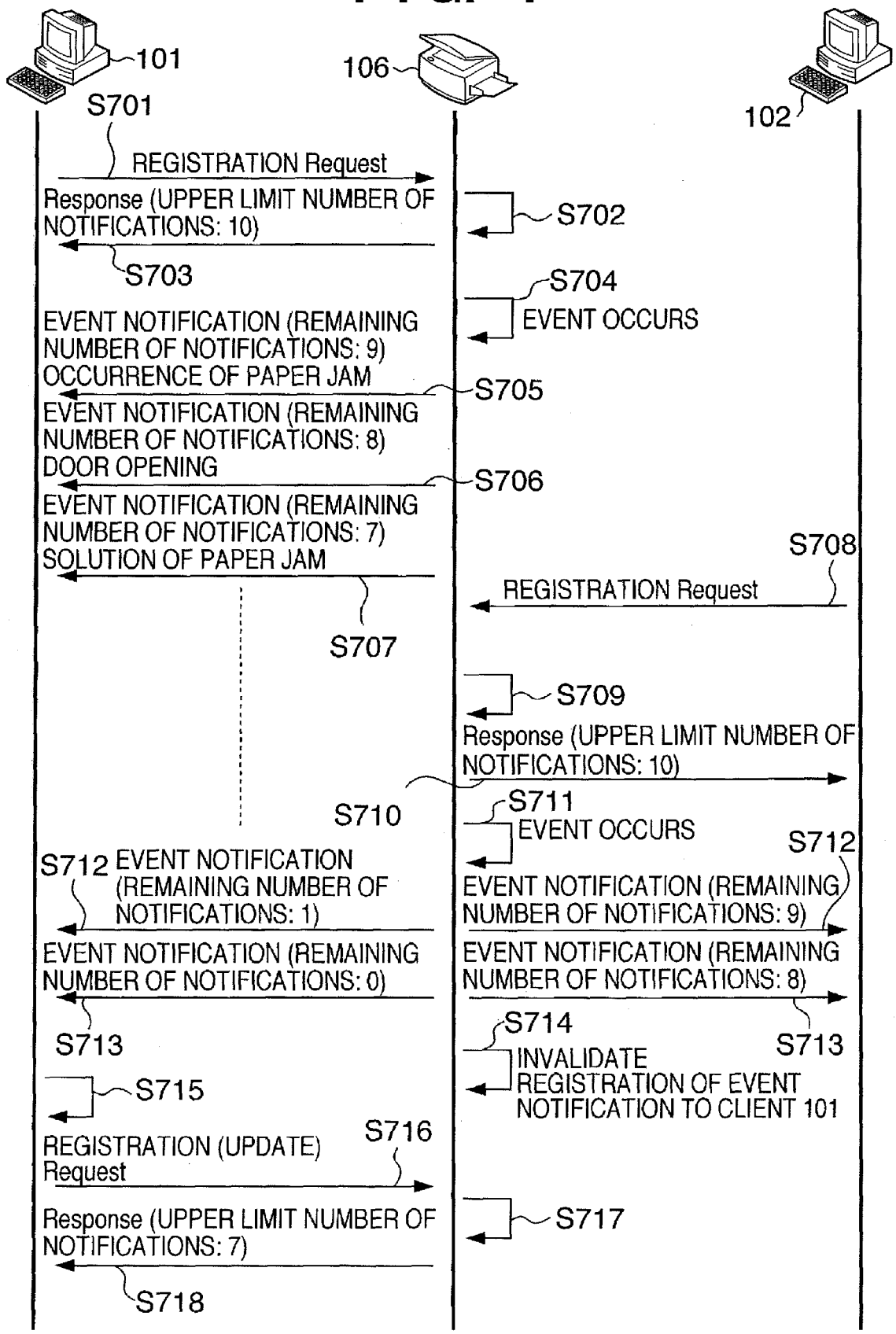
FIG. 7 is a timing chart showing the sequence of event notification registration and event information notification according to the embodiment.

FIG. 7 is a timing chart showing the sequence of event notification registration and event information notification according to the embodiment. As main processing, the client 101 and the client 102 respectively transmit an event notification registration request to the image forming apparatus 106. The image forming apparatus 106 notifies corresponding client(s) of the occurrence of event in accordance with the item(s) designated in the registration requests. Further, in the event notification, an upper limit for the number of transmissions of event notifications is set, and in a case where the number of transmitted event notifications reaches this limit, the registration of event notification from the image forming apparatus 106 to the client is invalidated. In a case that the client further requests for event notification, it is necessary for the client to perform event notification registration again. Hereinbelow, the details of the sequence will be described.

In step S701, the client 101 transmits an event notification registration request as a SOAP message to the image forming apparatus 106. In step S702, in response to the event notification registration request, the image forming apparatus 106 calculates the number of transmitted event notifications assured for the client 101, based on existing achievements of notification. Then the image forming apparatus 106 registers the client 101 as an event information notification destination into a management table. In step S703, a SOAP response message indicating the number of transmitted notifications is returned to the client 101. The SOAP response message includes information indicating that the event notification registration request has been accepted and the upper limit number of transmitted event notifications. In this example, the upper limit of notifications is 10 transmissions. In this case, the registration of event notification to the client 101 is valid until event information notifications are transmitted ten times. If the 10th event information notification from the image forming apparatus 106 to the client 101 has been made, the registration of event notification for the client 101 is invalidated. Accordingly, if the client 101 continuously requests for event information notification, it is necessary for the client 101 to issue an event notification registration request again. In steps S701 to S703, the event notification registration is completed.

Thereafter, in step S704, in a case where an event occurs in the printer engine 404 of the image forming apparatus 106, the occurrence of event is notified, based on the management table held in the event notification module 607, to the client registered in the management table (client 101). In this example, in step S705, the occurrence of paper jam is notified, then in step S706, the occurrence of door opening is notified, and in step S707, the solution (the image forming apparatus 106 has been recovered from the paper jam) of the paper jam is notified to the client 101. The number of transmitted event notifications is updated (incremented) and the remaining number of transmissions is updated upon each event notification.

Further, in steps S708 to S710, an event notification registration request from the client 102 is received, and a similar sequence to that in the case of the client 101 is performed. That is, in step S708, the event notification registration request is received, then in step S709, in response to the event notification registration request, the image forming apparatus 106 calculates the number of times of event notifications assured for the client 102. Then the image forming apparatus 106 registers the client 102 as an event information notification destination in the management table, and in step S710, returns a SOAP response message indicating the acceptance of the registration request and the number of transmissions of notification to the client 102.

In this example, the number of event information notification destinations is two, and when an event occurs in step S711, the image forming apparatus 106 transmits event information to the two clients 101 and 102 (steps S712 and S713). The both clients 101 and 102 have requested notification of printer-related events from the image forming apparatus 106.

In the event notification in step S713, the number of transmitted event notifications to the client 101 reaches the upper limit number (10). Accordingly, in step S714, the event notification module 607 deletes the client 101 from the management table, thereby invalidates the event notification registration for the client 101.

On the other hand, the client 101 determines, in accordance with the reception of the event information in step S713, that the event notification registration has become invalidated in the image forming apparatus 106. Then in step S715, the client 101 determines whether or not re-registration of event notification is necessary. If the client 101 determines that the re-registration is necessary, transmits an event notification registration request to the image forming apparatus 106 in step S716, as in the case of step S01. Then in step S717, the image forming apparatus 106 registers the client 101 in the management table, and calculates the upper limit number of event notifications assured for the client 101. Then in step S718, the image forming apparatus 106 returns a response indicating the acceptance of the event notification registration request and the upper limit number of event notifications to the client 101. The upper limit number of event notifications previously calculated is 10, while in step S718, the upper limit number of event notifications is 7, since at the time of step S717, the number of clients already registered in the management table is greater than that at the time of step S702. In this manner, upon reception of event notification registration request from a client, the number of times of event notification for the client is determined, in correspondence with the number of registered clients or the like.

FIG. 8 depicts a view illustrating an example of a SOAP (Simple Object Access Protocol) request message used by the client according to the embodiment upon event notification registration.

In the message, the client that transmitted the message is specified with a <ClientID> tag 801. In this example, the registration request is issued from the client (C101). The type of event information to be notified is individually specified with a <RequestEventList> tag 802. For example, in a case that printer-related event notification is required, "PrEv" indicating printer-related event notification is described in an <EventType> tag 803 as a child element of an <EventInfo> tag. Further, in a case that scanner-related event notification is required, "ScEv" is described in an <EventType> tag 804 as a child element of the <EventInfo> tag.

FIG. 9 depicts a view illustrating an example of a response message to an event notification registration request according to the embodiment.

In the response message, the client to which the message is directed is described in a <ClientID> tag 901. In this example, the client 101 is described as the destination of the response. In an <AcceptedEventList> tag 902, the type of event information which can be registrable for event notification is described in correspondence with the event information designated with the <RequestEventList> tag 802 in FIG. 8. An <EventInfo> tag corresponds with each type. A registration ID upon event notification registration in the image forming apparatus 106 is stored in a <RegistID> tag, the type of registration-successful event information is stored in an <EventType> tag, and the upper limit number of event notifications is stored in a <NotifyLimit> tag.

In FIG. 9, the tags indicated with numeral 903 show that the registration ID is "001111", the type of event information is printer-related "PrEv", and the upper limit number of event notifications is 12. Further, the tags indicated with numeral 904 show that the registration ID is "001112", the type of event information is scanner-related, and the upper limit number of event notifications is 7.

FIG. 10A depicts a view illustrating an example of a SOAP message used by the image forming apparatus 106 according to the embodiment upon event notification. FIG. 10B depicts a view illustrating an example of a response message returned from the client according to the embodiment upon event notification.

In the SOAP message indicating event information, the ID described in the <ClientID> tag in the event notification registration request (in this example, "C101") is described in a <To> tag 1001. This specifies the client as a destination of the message. The event information is described in an <EventDataList> tag 1002. In this example, event information to be notified is described by <EventType> tag. As indicated with numeral 1002 in FIG. 10A, a printer-related event "PrEv" is described, and as indicated with numeral 1003, event codes are listed in a <StatusCode> tag in a <Status> tag. Further, numeral 1004 in FIG. 10A indicates a scanner-related event "ScEv", and as indicated with numeral 1005, event codes are listed in the <StatusCode> tag in the <Status> tag. The client receives the message, and grasps the event occurred in the image forming apparatus 106 from the event codes listed in the <StatusCode> tags.

In the response message shown in FIG. 10B, when each client normally receives event information notification, it described "Success" in a <Return> tag 1006.

Figure 11:
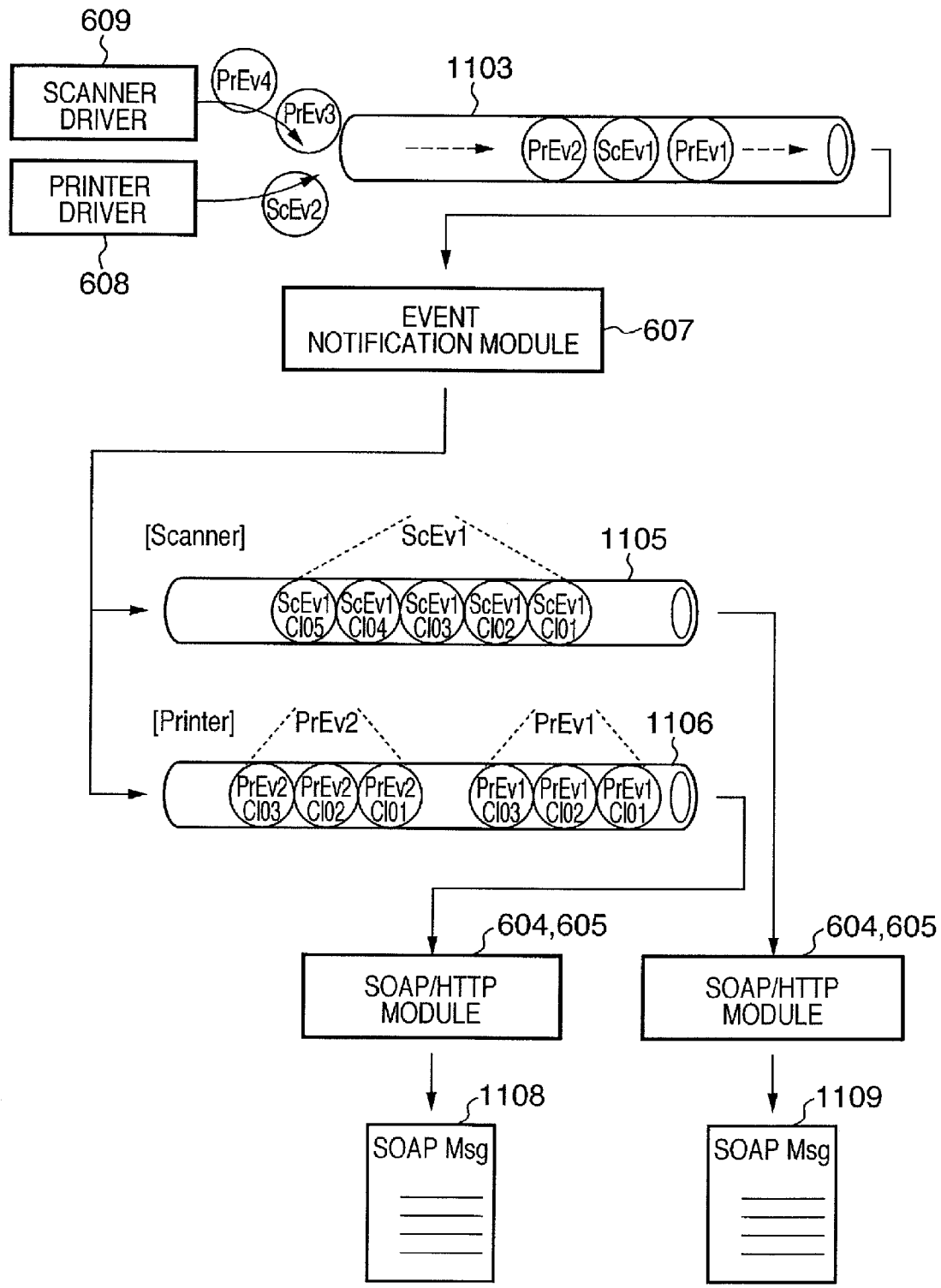
FIG. 11 is a block diagram schematically showing the functions of event queue processing in the image forming apparatus according to the embodiment.

FIG. 11 is a block diagram schematically showing the functions of event queuing processing in the image forming apparatus 106 according to the embodiment. In FIG. 11, elements corresponding to those of the software configuration of the image forming apparatus 106 in FIG. 6 have the same reference numerals, and the explanations of the elements will be omitted.

In a case that some printer-related and scanner-related events occur in the image forming apparatus 106, the printer driver 609 and the scanner driver 608 add the event information (PrEvi and ScEvi) (i is a variable indicating an order of event occurrence) to an event queue 1103 in the order of event occurrence. The event notification module 607 obtains the event information arrayed in the event queue 1103. Then the event notification module 607 supplies the event information arrayed in the event queue 1103 into any one of plural transmission queues, according to the order of the event occurrence and the type of event occurrence. In FIG. 11, numeral 1105 denotes a transmission queue of scanner-related event information, and numeral 1106 denotes a transmission queue of printer-related event information. The event information arrayed in the transmission queues 1105 and 1106 are converted into a SOAP message by the SOAP module 605/HTTP module 604, independent by event type, and transmitted via the TCP/IP module 602 and the network driver 601 to corresponding client(s). Numerals 1108 and 1109 denote SOAP messages indicating printer-related event information and scanner-related event information.

FIG. 12A to FIG. 14 depict views illustrating event information management tables held in the event notification module 607 according to the present embodiment. FIG. 12A shows a scanner-related management table, and FIG. 12B depicts a printer-related management table. FIG. 13 shows a NotifyLimit management table, and FIG. 14 depicts the event notification management table.

The event information management tables include three types of tables. The management table shown in FIG. 12A describes the linkage between event information added to the event queue by the scanner driver 608 and event information added to a transmission queue by the event notification module 607. In FIG. 12A, based on the scanner-related event information "ScEv1" arrayed in the event queue, scanner-related event information "ScEv1C101", "ScEv1C102", "ScEv1C103", "ScEv1C104" and "ScEv1C105" are added to the scanner-related transmission queue as shown in FIG. 11. Note that "ScEv1C101" indicates the event information "ScEv1" transmitted to the client "C101". Further, the other event information of "ScEv1" respectively indicate event information "ScEv1" transmitted to the clients "C102", "C103", "C104" and "C105". As the other scanner-related event information "ScEv2" is similar to the event information "ScEv1", the explanation of the information will be omitted.

Further, the management table shown in FIG. 12B describes the linkage between event information added to the event queue by the printer driver 609 and event information added to a transmission queue by the event notification module 607. In FIG. 12B, based on the printer-related event information "PrEv1" arrayed in the event queue, printer-related event information "PrEv1C101", "PrEv1C102" and "PrEv1C103" are added to the printer-related transmission queue. Note that "PrEv1C101" indicates the event information "PrEv1" transmitted to the client "C101". Further, the other event information of "PrEv1" respectively indicate event information "PrEv1" transmitted to the clients "C102" and "C103". As the other printer-related event information is similar to the event information "PrEv1", the explanation of the information will be omitted.

In the management table in FIG. 12A or 12B, when an event occurs and the event notification module 607 generates event information for notification, a record is added. Then, if the notification of the event information is successful, the record is deleted from the table. In an EvSrc field, a queue ID upon generation by the driver 608 or 609 is described. In an Sc(Pv)SndWaitEv field, a transmission queue ID is described. The table exists by the types of the event information.

In the NotifyLimit management table shown in FIG. 13, when an event notification registration request is received from a client and event notification registration is performed, one record is added by event information type. In a ClientID field, the ID of the client that sent the event notification registration request (Client ID) is registered. Further, in an EvType field, the type of event required by the client (EventType) (in this example, printer-related and scanner-related) is described. In a NotifyLimit field, the remaining number of times of event notification is stored. In a RegID field, a unique value is stored by <EventType> of each client as a registration ID of the event notification registration request.

The event notification management table shown in FIG. 14 is used for monitoring processing status of a current transmission queue and for calculation of a NotifyLimit value (the upper limit value of the number of event notifications) in a response to event notification registration request returned to a client. As the image forming apparatus 106 according to the present embodiment supports two event types, i.e., scanner-related and printer-related (ScEv/PrEv), the table has two records. In a QueueMax field, the maximum number of storable event information in the transmission queue (1105 or 1106 in FIG. 11) is shown by event type. In a ClientNum field, the number of clients currently registered as event notification destinations is described. In this example, the number of scanner-related event notification destinations is five, and the number of printer-related event notification destinations is three. In a SendWaiting Event field, the number of event information, generated by the event notification module 607 and in waiting status in the transmission queues 1105 and 1106 is described. In a Processing Event Field, the number of event information in the event queue 1103 as a base of event information in the transmission queues is described. In a Reserved field, the total number of the remaining numbers of times of notification times (NotifyLimit) in the NotifyLimit management table (FIG. 13) by event type (in this example, printer and scanner) is described. In a NewCl field, the number of clients assured as registrable event notification destinations is described. In a SndQueue field, a value calculated by [the number of event information storable in transmission queue (QueueMax)]−[the number of event information in waiting status in transmission queue (Sendwaiting Event)]−[the remaining number of times of notification (Reserved)] is described. Accordingly, in the SndQueue field, the number of event information newly handled in a transmission queue is described. The value of NotifyLimit is calculated as [the number of event information newly handled in transmission queue (SndQueue)]/[the number of clients registrable as event notification destinations (NewCl)]. In the NotifyLimit field, a maximum number (NotifyLimit) of times of event notification to a newly registered client is described.

Figure 15:
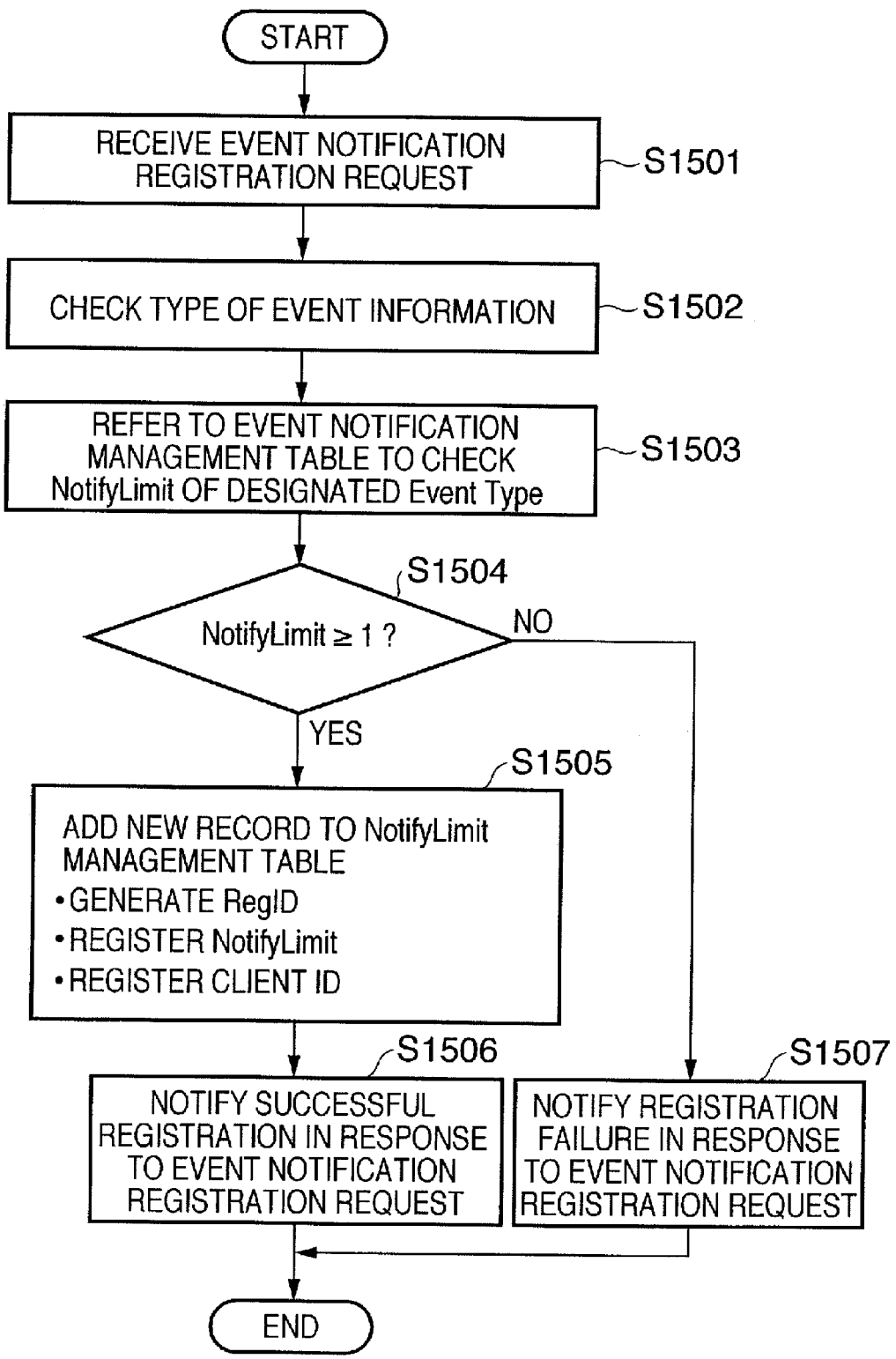
FIG. 15 is a flowchart showing processing in the image forming apparatus according to the embodiment upon reception of event notification registration request.

FIG. 15 is a flowchart showing processing in the image forming apparatus 106 upon reception of event notification registration request from a client. The program for performing the processing is loaded from the HDD 406 into the RAM 408 upon execution, and is performed under the control of the CPU 407.

First, in step S1501, when an event notification registration request shown in FIG. 8 is received, the process proceeds to step S1502, at which the type of event information required in the registration request is checked. Next, in step S1503, the event notification management table shown in FIG. 14 is referred to, and the number of times of notification (NotifyLimit value) assigned to the client that issued the request is obtained. Next, in step S1504, it is determined whether or not the NotifyLimit value obtained in step S1503 is equal to or greater than "1". In a case that it is determined that the value is not equal to or greater than "1", i.e., any number of times of notification cannot be assigned to the client, the process proceeds to step S1507, at which a response message including information indicating the failure of event notification registration is transmitted to the client that sent the registration request.

On the other hand, in a case that it is determined in step S1504 that the NotifyLimit value is equal to or greater than "1", the process proceeds to step S1505, at which a new record is added to the NotifyLimit management table shown in FIG. 13. That is, a new RegID unique to the entire NotifyLimit management table is generated, and the generated RegID, the NotifyLimit value obtained in step S1503 and the client ID described in the <ClientID> tag in the registration request received in step S1501 are described in the respective fields. Next, in step S1506, a response message including information indicating the successful event notification registration is transmitted to the client that issued the request.

Note that the processings at steps S1501, S1506 and S1507 are implemented by the SOAP module 605 in the software configuration in FIG. 6. Further, the processings at steps S1502, S1503, S1504 and S1505 are implemented by the event notification module 607.

Figure 16:
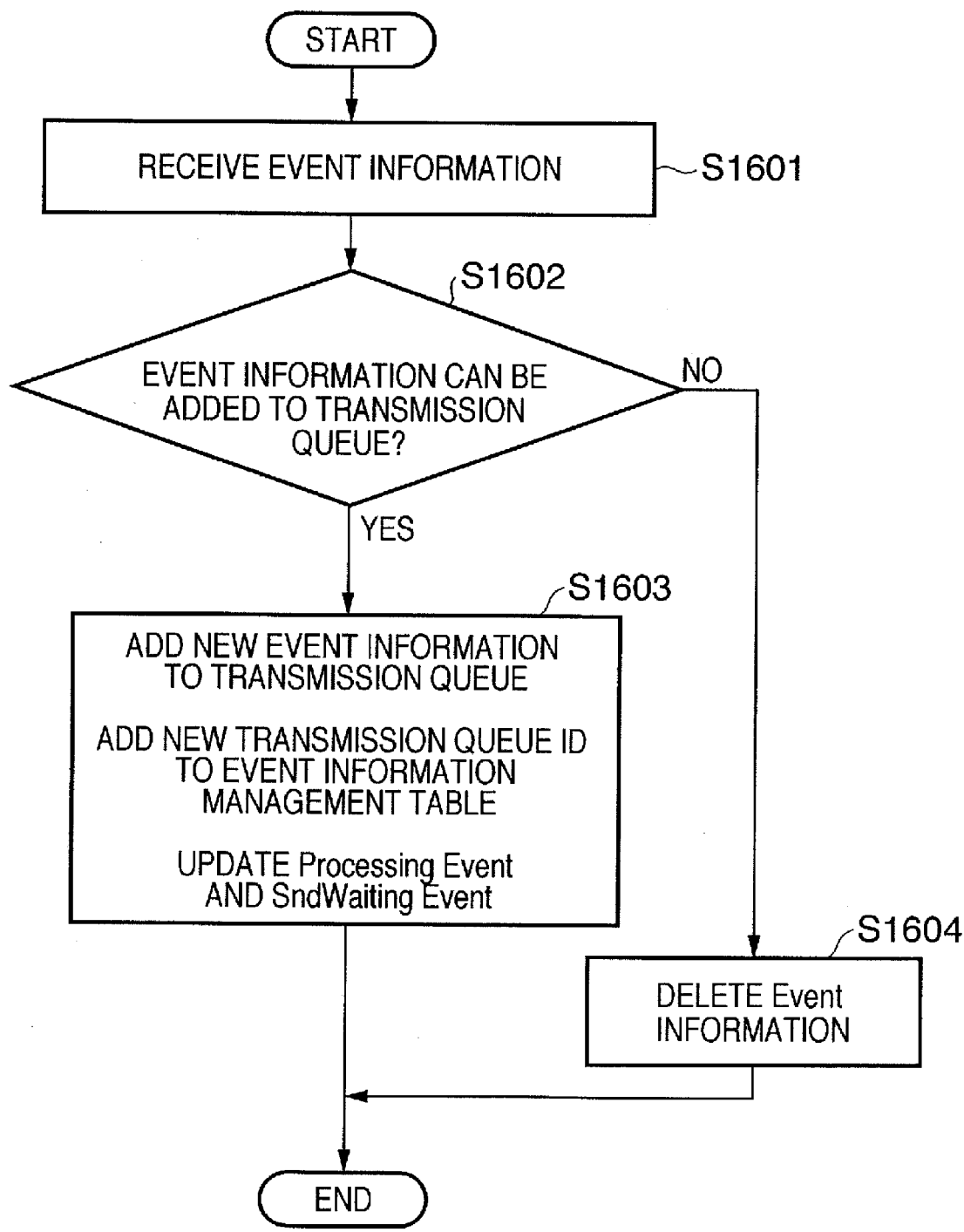
FIG. 16 is a flowchart showing event information notification queue generation processing performed in the image forming apparatus according to the embodiment.

FIG. 16 is a flowchart showing event information notification queue generation processing performed in the image forming apparatus 106 according to the embodiment. The program for performing the processing is loaded from the HDD 406 into the RAM 408 upon execution, and is performed under the control of the CPU 407.

In step S1601, the event notification module 607 receives event information indicating a newly occurred event from the printer driver 609 or the scanner driver 608. Next, in step S1602, it is determined whether or not the event information received in step S1601 can be added to the transmission queue 1103 managed with the management table shown in FIG. 12A or 12B. If the event information can be added to the transmission queue, the process proceeds to step S1603, otherwise, proceeds to step S1604. The determination as to whether or not the event information can be added to the transmission queue is made based on whether or not the number of event information arrayed in the transmission queue 1103 is the maximum number of event information storable in the transmission queue, or whether or not the number of clients registered as event notification destinations is over the upper limit value, or the like. In step S1603, the ID of transmission queue corresponding to the event information is added to the management table (FIG. 12A or FIG. 12B) so as to add the event information to the transmission queue 1103. Then, the Processing Event field and the SndWaiting Event field of the event notification management table shown in FIG. 14 are updated, and the process ends.

If it is determined in step S1602 that the event information cannot be added to the transmission queue, the process proceeds to step S1604, at which the event information obtained in step S1601 is deleted, and the process ends. Note that the processing shown in the flowchart of FIG. 16 is performed by the event notification module 607 in the software configuration in FIG. 6.

Figure 17:
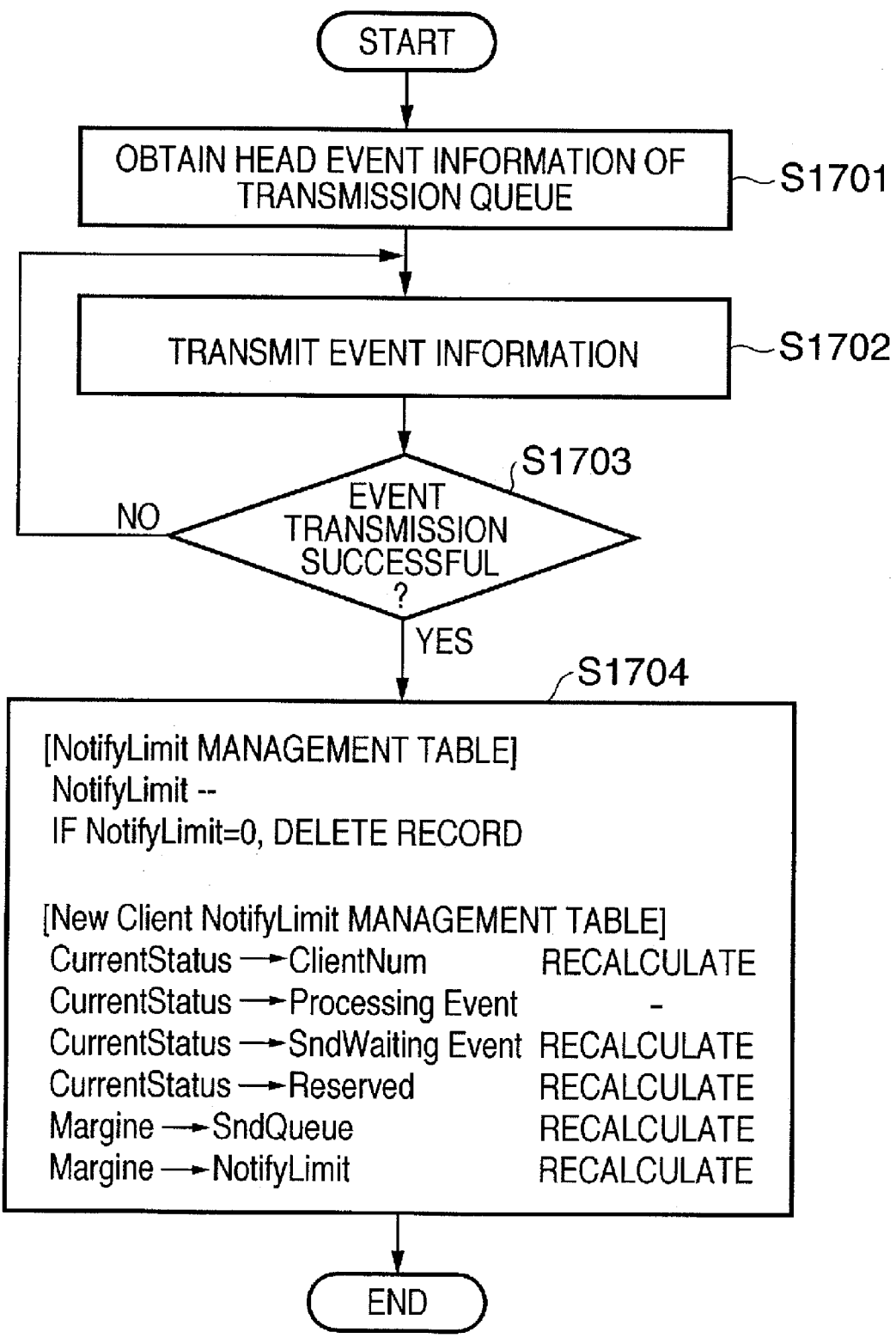
FIG. 17 is a flowchart showing management table update processing after completion of event information notification performed in the image forming apparatus according to the embodiment.

FIG. 17 is a flowchart showing management table update processing after the completion of notification (transmission) of event information implemented in the image forming apparatus 106 according to the embodiment. The program for performing the processing is loaded from the HDD 406 into the RAM 408 upon execution, and is performed under the control of the CPU 407.

First, in step S1701, the head event information of the transmission queue 1103 is obtained. Next, in step S1702, the event information obtained in step S1701 is notified to a corresponding client. Next, in step S1703, it is determined whether or not the event notification has been successful. If the event notification has not been successful, the process returns to step S1702. If the event notification has been successful, the process proceeds to step S1704, at which the NotifyLimit value corresponding to the client as the notification destination is decremented by one (−1) in the NotifyLimit management table shown in FIG. 13. As a result, if the NotifyLimit value becomes "0", the record for the client is deleted from the management table. In accordance with the deletion, the values in the ClientNum field, the Processing Event field, the SendWaiting Event field, the Reserved field, the SndQueue field and the NotifyLimit field in the event notification management table shown in FIG. 14 are updated, and the process ends.

As described above, according to the present embodiment, it is possible for the image forming apparatus to dynamically determine the upper limit value of the number of transmissions of event notifications to a client which requests for event notification registration, in correspondence with the number of event information arrayed in the transmission queue. Note that in the above description, the period of validity of event notification registration is indicated with the number of times of notification, however, the period may be indicated with a time period. In this case, the time period of validity is determined based on the number of event information newly handled in the transmission queue, the number of registrable clients assured as event notification destination, and the number of event information in notification-waiting status in the transmission queue.

In the above arrangement, even when the number of clients registered as event notification destinations is abruptly increased or the number of events is abruptly increased, the notification destinations can be narrowed down and, and client(s) previously registered as notification destinations can be infallibly notified of event. Further, as the reception of new event notification destinations is limited, event information can be notified without any failure, and heavy-load status can be avoided.

Note that in the present embodiment, event notification is performed between the image forming apparatus and the clients, however, the present invention is not limited to this arrangement, but is applicable to event processing between general client and server, between PCs, or between a PC and various input/output devices.

Other Embodiment

The present invention can be applied to a system constituted by a plurality of devices or to an apparatus comprising a single device.

Furthermore, the invention can be implemented by supplying a software program, which implements the functions of the foregoing embodiment, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention. In this case, so long as the system or apparatus has the functions of the program, the program may be executed in any form, such as an object code, a program executed by an interpreter, or script data supplied to an operating system.

Example of storage media that can be used for supplying the program are a floppy (registered trademark) disk, a hard disk, an optical disk, a magneto-optical disk, an MO, a CD-ROM, a CD-R, a CO-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100394, filed Mar. 31, 2006, which hereby incorporated by reference herein in its entirety.

What is claimed is:

1. An electric device for notifying an external device of status information, the electric device comprising:
a microprocessor coupled to a memory,
wherein the microprocessor is programmed to:
receive a registration request for registration of event notification to notify the external device of the status information in said electric device, from the external device;
notify the external device, for which the event notification is registered in correspondence with the registration request, of the status information;
dynamically decide a period in which the event notification is valid based on a number of event information newly handled in a transmission queue, a number of newly registrable external devices as an event notification destination, and a number of event information in notification-waiting status in the transmission queue; and
invalidate the event notification upon expiration of the decided valid period.

2. The electric device according to claim 1, wherein said microprocessor is further programmed to transmit the decided valid period to the external device that transmitted the registration request.

3. The electric device according to claim 1, wherein said microprocessor is further programmed to notify a remaining period of the decided valid period with the status information.

4. The electric device according to claim 1, wherein said microprocessor is further programmed to register identification information of the external device for which the event notification is registered in correspondence with the registration request, a type of status information to be notified, and the decided valid period.

5. The electric device according to claim 1, wherein said microprocessor is further programmed to determine whether or not the event notification is able to be registered based on the decided valid period.

6. The electric device according to claim 1, wherein the decided valid period is indicated with a number of times of notification of status information.

7. A control method in an electric device for notifying an external device of status information, the control method comprising:
a reception step of receiving a registration request for registration of event notification to notify the external device of the status information in the electric device, from the external device;
a notification step of notifying the external device, for which the event notification is registered in correspondence with the registration request, of the status information;
a decision step of dynamically deciding a period in which the event notification is valid; and
an invalidation step of, upon expiration of the period decided in said decision step, invalidating the event notification,
wherein said decision step decides the period based on a number of event information newly handled in a transmission queue, a number of newly registrable external devices as an event notification destination, and a number of event information in notification-waiting status in the transmission queue.

8. The method according to claim 7, further comprising a period notification step of transmitting the period decided in said decision step to the external device that transmitted the registration request.

9. The method according to claim 7, wherein said notification step notifies a remaining period of the period decided in said decision step with the status information.

10. The method according to claim 7, further comprising a registration step of registering identification information of the external device for which the event notification is registered in correspondence with the registration request, a type of status information to be notified, and the period decided in said decision step.

11. The method according to claim 7, further comprising a determination step of determining whether or not the event notification is able to be registered based on the period decided in said decision step.

12. The method according to claim 7, wherein the period decided in said decision step is indicated with a number of times of notification of status information.

* * * * *